April 15, 1924.
D. TENNEY
PEELING MACHINE
Filed July 30, 1921    5 Sheets-Sheet 2
1,490,493
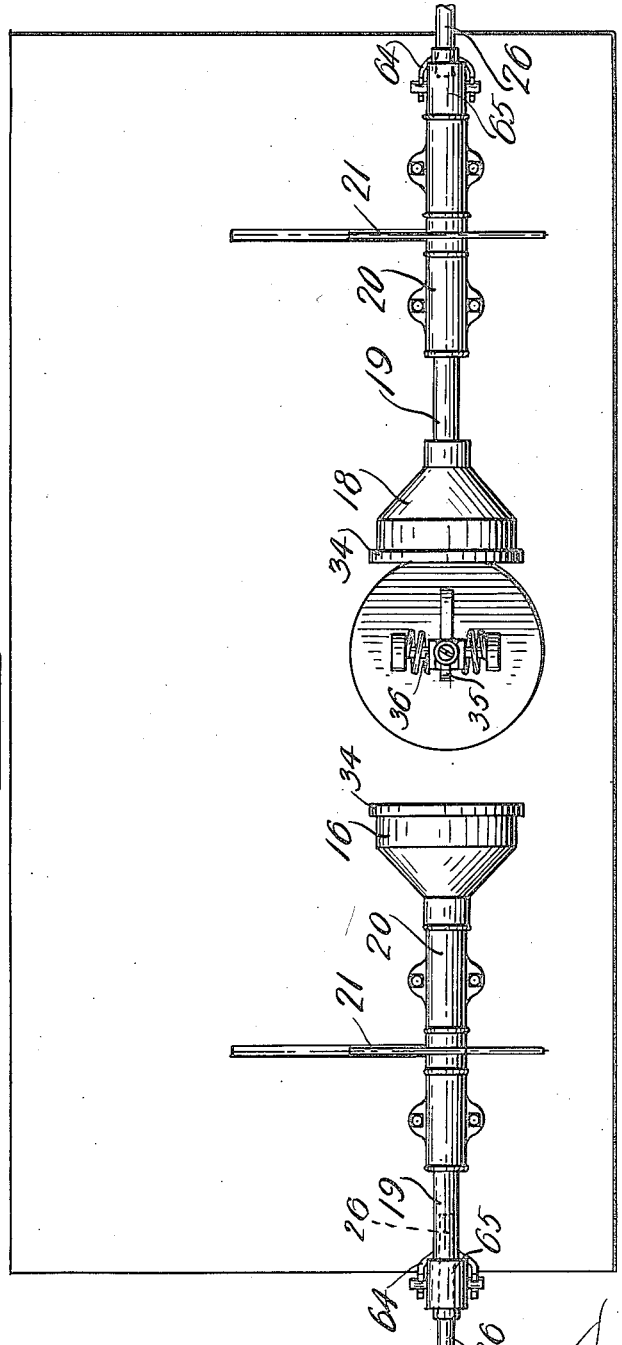
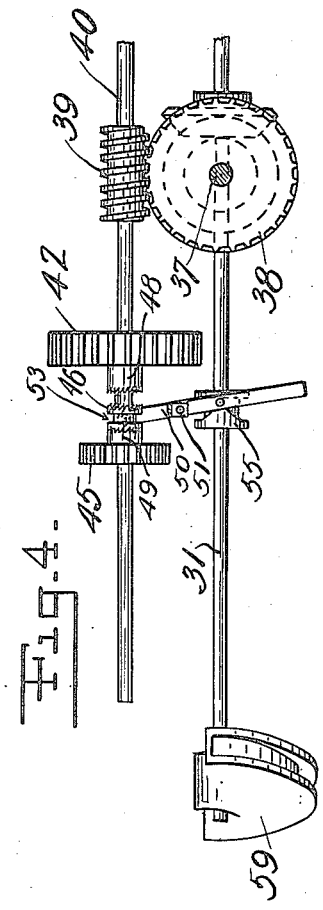

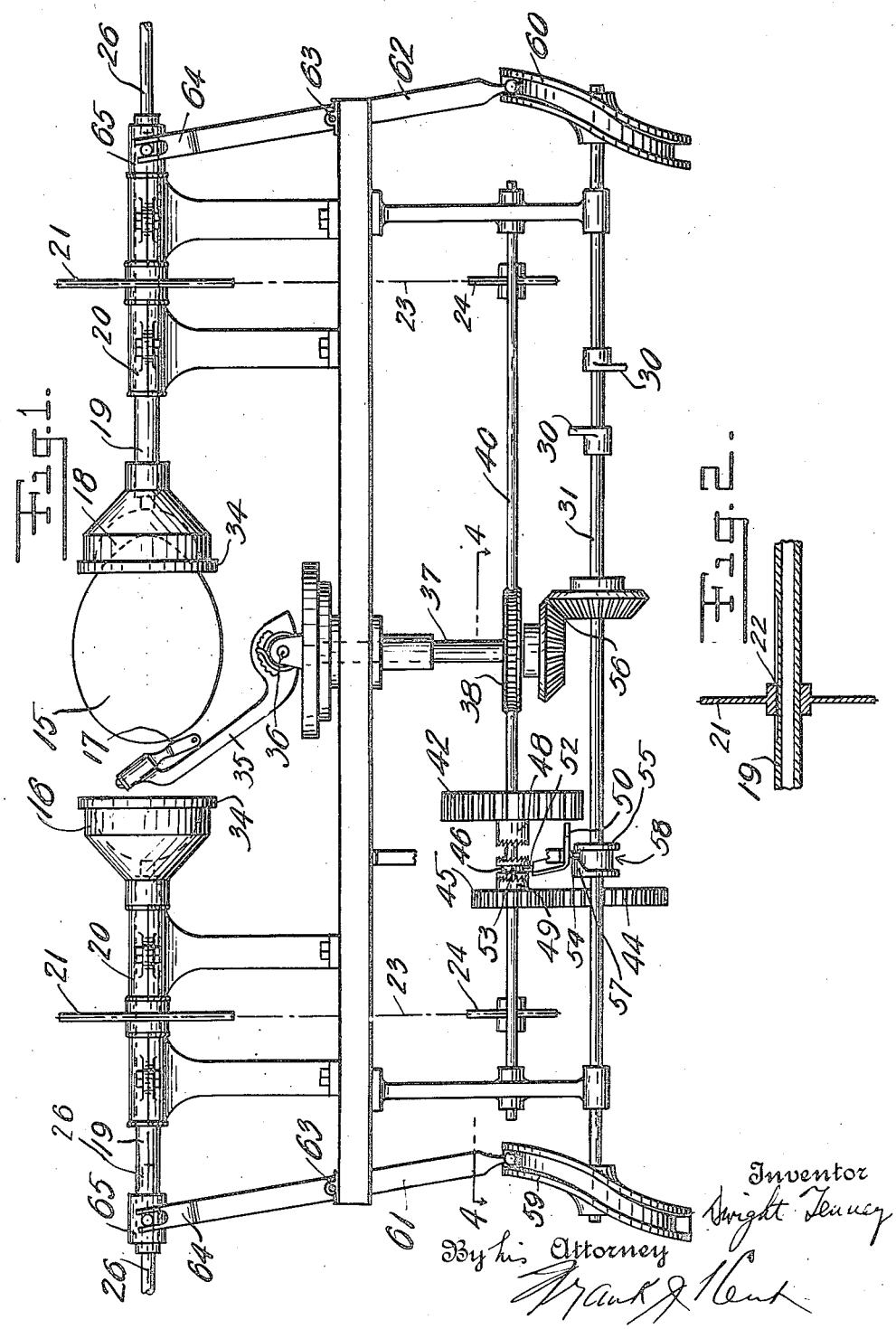

April 15, 1924. 1,490,493
D. TENNEY
PEELING MACHINE
Filed July 30, 1921  5 Sheets-Sheet 3
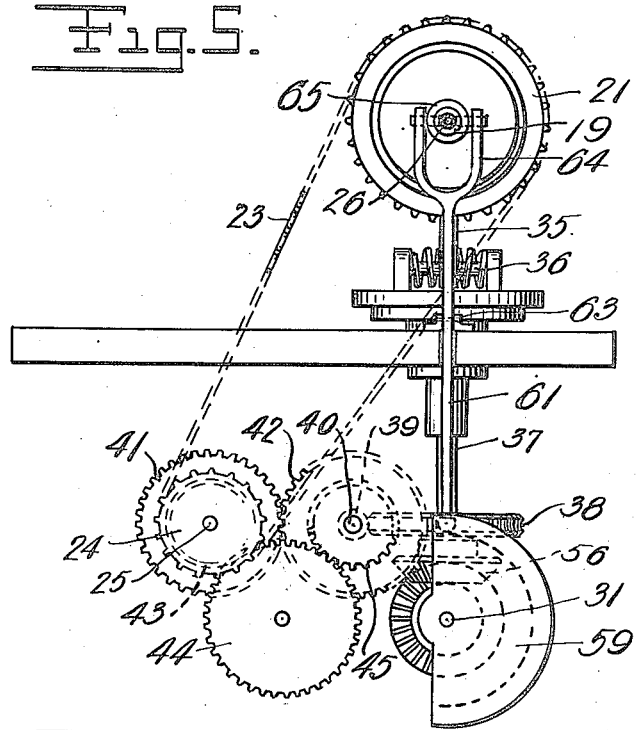

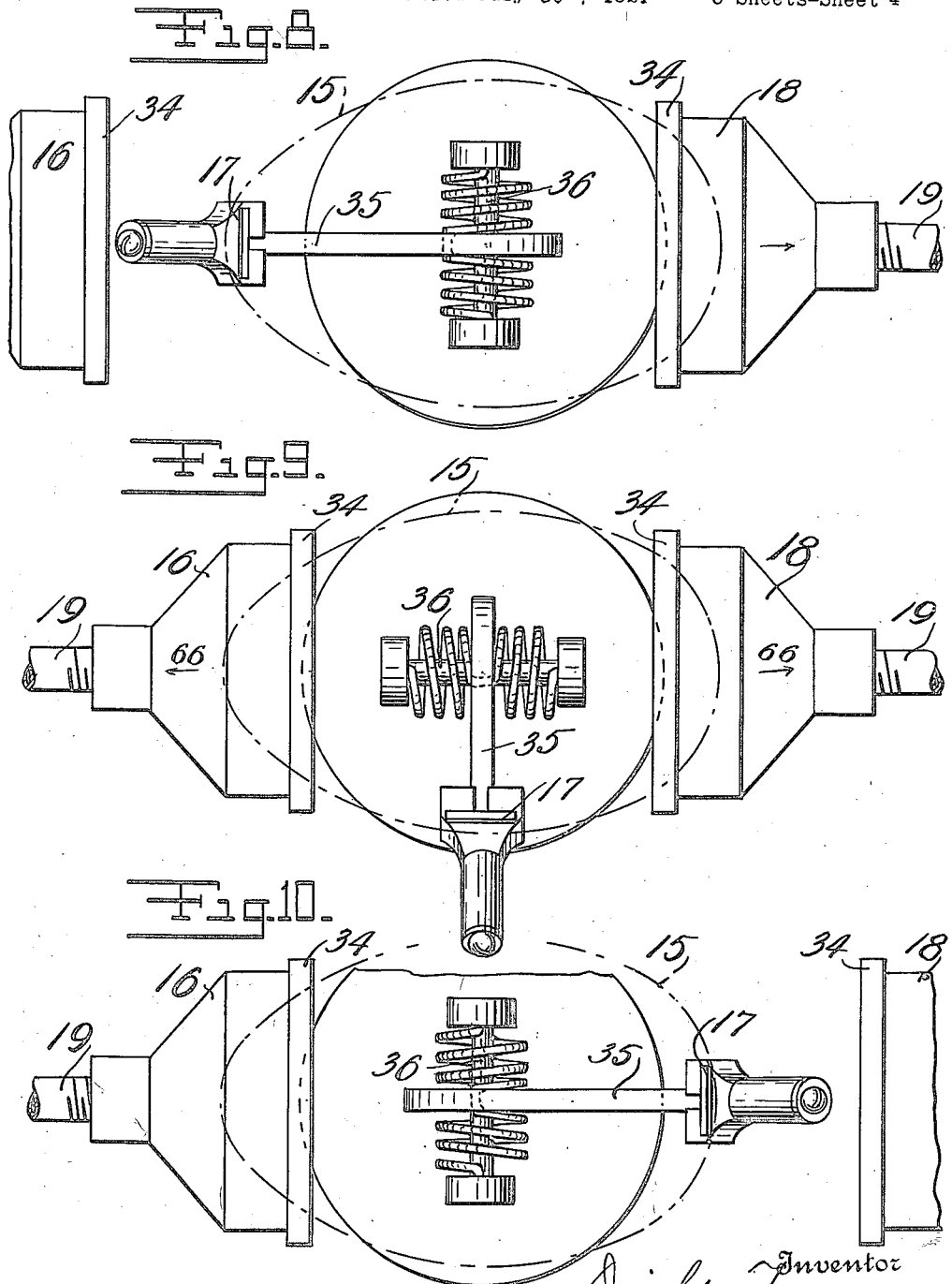

April 15, 1924.
D. TENNEY
PEELING MACHINE
Filed July 30, 1921    5 Sheets-Sheet 5
1,490,493
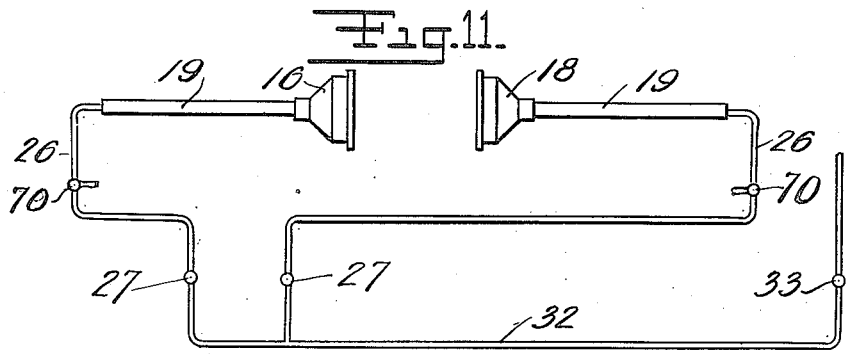
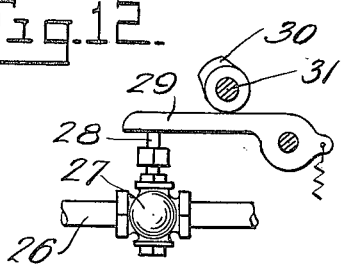
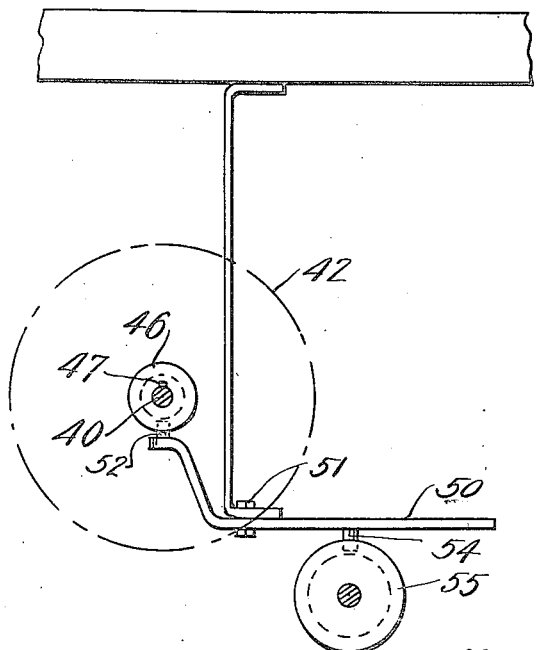
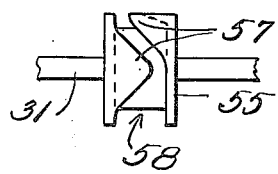

Patented Apr. 15, 1924.

1,490,493

UNITED STATES PATENT OFFICE.

DWIGHT TENNEY, OF BROOKLYN, NEW YORK, ASSIGNOR TO FRANKLIN BAKER COMPANY, OF PHILADELPHIA, PENNSYLVANIA.

PEELING MACHINE.

Application filed July 30, 1921. Serial No. 488,734.

*To all whom it may concern:*

Be it known that I, DWIGHT TENNEY, a citizen of the United States, residing at Brooklyn, in the county of Kings and State of New York, have invented certain new and useful Improvements in a Peeling Machine, of which the following is a specification.

In preparing coconuts for use, the usual steps are to first remove the husk, then to remove the hard shell, and finally to peel off the tough brown skin which forms a protective covering for the meat. My invention relates particularly to the removal of this tough protective skin and the objects of the invention are to provide simple and effective mechanism for quickly peeling off this skin without wasting or injuring the meat.

Other objects and various novel features of construction, combinations and relations of parts will appear as the specification proceeds.

In the drawings accompanying and forming part of this specification, I have illustrated the invention embodied in but one simple form, but wish it understood that the structure may be modified in various respects without departure from the true spirit and scope of the invention and further wish it understood that the terms employed herein are used in the descriptive, rather than in a limiting sense, except, of course, for such limitations as may be imposed by the prior art.

Figure 1 in the drawings referred to is a broken side elevation of the main parts of a machine embodying features of the invention.

Figure 2 is a detail sectional view of part of the drive mechanism.

Figure 3 is a top plan view of the machine.

Figure 4 is a broken plan and sectional view of parts of the machine as taken on substantially the plane of line 4—4 of Figure 1.

Figure 5 is an end view of the machine as seen from the left in Figure 1.

Figure 6 is a detail broken sectional view illustrating the nut kernel held in the pneumatic chuck and the peeling knife as making its cut along the side of the kernel.

Figure 7 is a broken sectional view of one of the chucks.

Figure 8 is a plan view of the chucks with the nut kernel indicated in dot and dash lines and with the second chuck standing inoperative.

Figure 9 is a similar view with the knife shown as having completed half of its cut and showing the second chuck as advanced into operative engagement with the nut.

Figure 10 is another view of this sort with the second chuck illustrated as retracted, and the knife as having completed the cut.

Figure 11 is a diagrammatic view showing the air connections for the two chucks.

Figure 12 is a detail view showing actuating means for one of the chuck control valves.

Figure 13 is a vertical sectional view showing particularly the cam controlled clutch operating means.

Figure 14 is a broken detail view of the clutch controlling cam.

In Figure 1 the nut kernel, husked and shelled, is indicated at 15 as held at one end in the grasp of a pneumatic chuck 18, and the knife is shown at 17 as starting its cut about the exposed or free end of the kernel.

This nut kernel, as is well known, is generally elliptical or ovoidal in shape and is therefore adapted to be held equally well at either end in the grasp of a pneumatic chuck. In my invention I have taken advantage of this fact, and support the kernel first from one end, while making approximately half the cut and then support it from the opposite end, well completing the cut.

For this purpose I provide to cooperate with the first chuck, a second chuck 16 in longitudinal alinement therewith and operated to take hold of the kernel after the first chuck has performed its operation.

In the present embodiment of the invention, the chucks are carried by tubular shafts 19 slidably supported in journal bearings 20 and rotated by sprocket gears 21 slidably keyed on such shafts, as shown at 22 in Figure 2. these gears being engaged by suitable drive chains 23 extending about sprockets 24 on the drive shaft 25 (Figure 5).

Suction is applied to the chucks by suitable piping 26 connected with the outer ends of the tubular shafting. The piping for each chuck is flexible or telescopic (Figs. 1 and 3) for at least a portion of its length to allow for the in and out movements of the chucks and in each branch, that is, in the line leading to each chuck (Figure 11) there is provided a suction valve 27 and an atmospheric or relief valve 70 which may be on the order of that shown in Figure 11, each having a stem 28 operated by a lever 29, controlled and actuated by a tappet or cam 30 on the cam shaft 31. The suction lines leading to the two chucks are shown in Figure 11 as connected with a suitable main 32 governed by a hand valve 33.

The chucks are of cupped shape, as shown particularly in Figure 6, to receive the more or less pointed ends of the nut kernels and they may be faced with rubber gaskets or washers, as I have indicated at 34, to insure a close fit and hence a firm grip on the kernel.

The knife may be of any usual or special design, it being shown herein simply as a blade carried by an upstanding spring-pressed arm 35 pivoted horizontally at 36 on the upper end of a vertical shaft 37. This shaft carries a worm gear 38 at its lower end engaged and driven by a worm 39 on the shaft 40.

The last-mentioned shaft is reversible, being driven alternately in opposite directions by the mechanism now to be described. The main drive shaft 25, as shown particularly in Figure 5, carries a fast gear 41 in constant mesh with a gear 42 loose on the shaft 40 and another fast gear 43 in mesh with an idler 44 which engages a second gear 45 also loose on the shaft 40. From this it will be seen that by alternately coupling the gears 42 and 45 to the shaft 40, said shaft will be driven first in one direction and then in the opposite direction.

In the present machine, the coupling of these reversely acting gears to the shaft is effected by means of a double ended clutch sleeve 46 slidingly keyed on the shaft 40, as shown at 47 in Figures 1, 4 and 13, and having drive jaws or teeth at its opposite ends to engage corresponding jaws or teeth on the opposed hubs 48, 49 of the gears 42 and 45.

This reversing clutch sleeve is shifted in opposite directions by means of the lever 50 shown in Figures 1, 4 and 13 as pivoted at 51 and carrying a pin 52 at its inner end engaging in a groove 53 in the clutch sleeve, said lever carrying at its outer end a pin 54 engaging in a groove in the cam 55. This cam is fixed on the cam shaft 31 which, as particularly shown in Figure 1, is driven by bevel gearing 56 from the upright worm driven shaft 37.

Reversely inclined shoulders 57 at opposite sides of the cam 55 serve to shift the lever 50 in opposite directions so as to throw the clutch sleeve first into driving engagement with one and then the other of the two gears 42 and 45, and in addition the groove of said cam is shown provided with a widened portion 58 (Figures 1 and 14) which will allow the outer end of the reversing lever 50 to be shifted by hand so as to bring the clutch sleeve to an intermediate neutral position, where it will be free from driving engagement with either one of the gears. This enables the machine to be readily stopped at any time.

The in and out movements of the opposed chuck members are effected in the machine disclosed by cams 59 and 60 on the opposite ends of the cam shaft 31 having, as shown in Figure 1, substantially parallel cam tracks engaged by the lower ends of the levers 61 and 62 pivoted on the frame or base of the machine, as indicated at 63, and having forks 64 at their upper ends engaging with shifting sleeve 65 rotatably fixed on the outer end portions of the chuck shafts.

From the showing in Figures 1 and 8 it will be clear that as cam shaft 31 is turned away from the observer or in a left handed direction, as viewed in Figure 5, the knife 17, through the connections described, starting in the space between the chuck 16 and the left hand end of the nut, turns about its supporting axis 37 far enough to carry it around the exposed end and intermediate portion of the nut kernel and clear of the space between the end of the kernel and the adjoining face of the chuck 16. The cams 59 and 60 are so designed that when this takes place, that is, when the knife to complete the first part of its cut, is clear of the chuck 16, the chuck 16 approaches the nut until a point is reached, such as indicated in Figure 9, where both chucks are engaged with opposite ends of the nut kernel. At this time the valves are controlled to cause both chucks to exert suction on the nut kernel and the kernel is therefore equally supported for a time by both chucks. This condition preferably is maintained only for that period of time which it takes to securely transfer the kernel from one chuck to the other. This transfer takes place at approximately the time the knife has reached the center of its cut, as shown in Figure 9 where the arrows 66 indicate that suction at this time is being exerted by both chucks 16 and 18. After the second acting chuck, chuck 16 in this case, has obtained a firm grip on the then finished end of the nut kernel, the suction valve 27 and the relief valve 70 of the first chuck 18 are operated to shut off the suction and to break the vacuum, this chuck backs away as shown in Figure 10, the knife continues its cut on around the then exposed right hand end of the nut, and the chuck 18 stands or dwells so as to provide clear space in which the knife can operate to the axial line of the kernel.

It is believed that the operation will be clear from this description, it being understood that at the end of each half revolution of the shaft 31, the reversing cam 55 will operate to stop the machine and that at the end of such movement, the knife will have been turned through approximately 180 degrees so as to cut entirely around the nut kernel from one end to the other and that during such operation of the knife, the nut will rotate in the one position over the swinging knife and will be transferred from the grip of one chuck to the other. At the completion of each paring operation, a fresh nut kernel will be inserted in the chuck which stands in the projected position so that operations will start alternately first with one chuck and then the other. This means that at the completion of a cut, the parts are in readiness to receive another nut kernel so that no time need be lost between successive operations.

What I claim is:

1. In a machine of the character described, cooperating rotary chucks for engagement with opposite ends of an article therebetween, means for operating said chucks to transfer the article from one chuck to the other and to provide clear space between the unsupported end of the article and the chuck adjacent thereto and a cutting tool adapted for movement against the surface of the supported article from end to end thereof and about said ends.

2. A machine for operating on spheroidal or ovoidal objects comprising cooperating rotary chucks arranged in opposition and each adapted to support the object therebetween by engagement with the adjacent end thereof, a cutting tool for operating on the surface of the object, means for effecting a relative movement of the tool along the sides and about the ends of the supported object and means for operating the chucks to first support the object from one end and then from the opposite end thereof.

3. A machine for operating on spheroidal or ovoidal objects comprising rotating chucks arranged face to face and each adapted to support an intervening object by engagement with the adjacent end thereof, means for operating one chuck to first support the object from one end, means for first operating the other chuck clear of the other end of the object and then producing a holding engagement of said chuck with the adjacent end of the object and a pivotally mounted cutting tool adapted for movement along the sides and about the end of the object during the time that said chuck and the object are clear of each other.

4. A machine for operating on spheroidal or ovoidal objects comprising rotating chucks arranged face to face and each adapted to support an intervening object by engagement with the adjacent end thereof, means for operating one chuck to first support the object from one end, means for first operating the other chuck clear of the other end of the object and then producing a holding engagement of said chuck with the adjacent end of the object and a pivotally mounted cutting tool adapted for movement along the sides and about the end of the object during the time that said chuck and the object are clear of each other, said chucks having suction cups to receive the ends of the object and the operating means aforesaid including devices for controlling the suction exerted by said cups.

5. A machine for operating on spheroidal or ovoidal objects comprising rotating chucks arranged face to face and each adapted to support an intervening object by engagement with the adjacent end thereof, means for operating one chuck to first support the object from one end, means for first operating the other chuck clear of the other end of the object and then producing a holding engagement of said chuck with the adjacent end of the object, a pivotally mounted cutting tool adapted for movement along the sides and about the end of the object during the time that said chuck and the object are clear of each other, said chucks having suction cups to receive the ends of the object and the operating means aforesaid including devices for controlling the suction exerted by said cups and resilient facings for said chucks to compensate for irregularities in the surface of the objects.

6. A machine for operating on spheroidal or ovoidal objects comprising rotating chucks arranged face to face and each adapted to support an intervening object by engagement with the adjacent end thereof, means for operating one chuck to first support the object from one end, means for first operating the other chuck clear of the other end of the object and then producing a holding engagement of said chuck with the adjacent end of the object and a pivotally mounted cutting tool adapted for movement along the sides and about the end of the object during the time that said chuck and the object are clear of each other, the operating means for the first chuck including mechanism for effecting separation of said chuck from the object when the object is wholly supported by the second chuck.

7. A machine for operating on spheroidal or ovoidal objects comprising rotating chucks arranged face to face and each adapted to support an intervening object by engagement with the adjacent end thereof, means for operating one chuck to first support the object from one end, means for first operating the other chuck clear of the other end of the object and then producing a holding engagement of said chuck with the adjacent end of the object and a pivotally mounted cutting tool adapted for movement along the sides and about the end of the object during the time that said chuck and the object are clear of each other, the operating means for the first chuck including mechanism for effecting separation of said chuck from the object when the object is wholly supported by the second chuck and the means for operating the tool being adapted to effect traverse of the tool over the adjacent end of the object when the first chuck is clear of the same.

8. In a machine of the character disclosed, opposed chucks each arranged to supportably engage the opposite ends of an object positioned therebetween, a movably supported tool adapted for progressive advancement along the surface and about the ends of the supported object, and means for alternately advancing and retracting the chucks into holding engagement and free of the opposite ends of the object.

9. In a machine of the character disclosed, opposed chucks each adapted to supportably engage the adjacent end of an object positioned therebetween, a cutting tool adapted for surface engagement with the supported object, means for progressively advancing said tool from the space between the end of the object and the inactive chuck and toward the supported end of the object held in the active chuck and means for effecting supporting engagement of the inactive chuck with the unsupported end of the object as the tool travels clear of the space between said end of the object and the inactive chuck.

10. In a machine of the character disclosed, opposed chucks each adapted to supportably engage the adjacent end of an object positioned therebetween, a cutting tool adapted for surface engagement with the supported object, means for progressively advancing said tool from the space between the end of the object and the inactive chuck and toward the supported end of the object held in the active chuck and means for relatively shifting the inactive chuck and the object to bring the object into supported engagement with the inactive chuck and for thereafter retracting the first chuck to leave the object wholly supported by the second chuck.

11. In a machine of the character disclosed, oppositely arranged chucks each adapted to independently support an object by engagement with the adjacent end portion thereof, means for approaching and separating said chucks to transfer an object held by one into supported engagement with the other and a longitudinally movable cutting tool arranged to operate on the opposite ends of the object in the shifting of the same from one chuck to the other.

12. In a machine of the character disclosed, axially alined slidably supported shafts, opposed chucks carried thereby, means for advancing and retracting said shafts to approach and separate the chucks and a longitudinally movable cutting tool arranged between the chucks.

13. In a machine of the character disclosed, axially alined slidably supported shafts, opposed chucks carried thereby, means for advancing and retracting said shafts to approach and separate the chucks, a longitudinally movable cutting tool arranged between the chucks and means for automatically shifting said tool during the movements of the chuck shafts aforesaid.

14. In a machine of the character disclosed, axially alined slidably supported shafts, opposed chucks carried thereby, means for advancing and retracting said shafts to approach and separate the chucks, a longitudinally movable cutting tool arranged between the chucks and means for automatically shifting said tool back and forth through a predetermined arc during the movements of the chuck shafts aforesaid.

15. In a machine of the character disclosed, axially alined slidably supported shafts, opposed chucks carried thereby, means for advancing and retracting said shafts to approach and separate the chucks, driving gears slidably keyed on the chuck shafts and through which said shafts may slide and a longitudinally movable cutting tool arranged between the chucks.

16. In a machine of the character disclosed, chucks supportably engageable with the opposite ends of an object interposed therebetween, a tool holder, a shaft, cam mechanism on said shaft for shifting the chucks, a drive shaft, a reversing cam on the cam shaft and reversely operating driving connections from the drive shaft to the tool holder and cam shaft, said connections being under control of the reversing cam aforesaid.

17. In a machine of the character disclosed, chucks supportably engageable with the opposite ends of an object interposed therebetween, a tool holder, a shaft, cam mechanism on said shaft for shifting the chucks, a drive shaft, a reversing cam on the cam shaft and reversely operating driving connections from the drive shaft to the tool holder and cam shaft, said connections being under control of the reversing cam aforesaid, said reversing connections being manually controllable independently of the automatic operation thereof.

18. In a machine of the character disclosed, chucks supportably engageable with the opposite ends of an object interposed therebetween, a tool holder, a shaft, cam mechanism on said shaft for shifting the chucks, a drive shaft, a reversing cam on the cam shaft, reversely operating driving connections from the drive shaft to the tool holder and cam shaft, said connections being under control of the reversing cam aforesaid and constant drive connections from the drive shaft to the chucks, including means for enabling the shifting movements of the chucks.

19. In a machine of the character disclosed, slidingly supported alined chuck shafts, chucks carried thereby, a drive shaft, a cam shaft, a shaft intermediate the drive shaft and cam shaft, reversely operating drive gearing from the drive shaft to the intermediate shaft, cam means on the cam shaft for controlling said reversely operating drive gearing, cam means on the cam shaft for shifting the chuck shafts, drive means from the intermediate shaft to the cam shaft, a tool carrier and drive connections from the intermediate shaft to said tool carrier.

20. A machine for operating on spheroidal or ovoidal objects comprising rotating chucks arranged face to face and each adapted to support an intervening object by engagement with the adjacent end thereof, means for operating one chuck to first support the object from one end, means for first operating the other chuck clear of the other end of the object and then producing a holding engagement of said chuck with the adjacent end of the object and a pivotally mounted cutting tool adapted for movement along the sides and about the end of the object during the time that said chuck and the object are clear of each other, said chucks operating at all times to hold the object substantially centered with respect to the tool.

21. A machine for operating on spheroidal or ovoidal objects comprising rotating chucks arranged face to face and each adapted to support an intervening object by engagement with the adjacent end thereof, means for operating one chuck to first support the object from one end, means for first operating the other chuck clear of the other end of the object and then producing a holding engagement of said chuck with the adjacent end of the object and a pivotally mounted cutting tool adapted for movement along the sides and about the end of the object during the time that said chuck and the object are clear of each other, said chucks having suction cups to receive the ends of the object and the operating means aforesaid including devices for controlling the suction exerted by said cups and for breaking the vacuum to relieve the holding force of the cups.

In testimony whereof I affix my signature.
DWIGHT TENNEY.